June 4, 1940.  E. X. SCHMIDT  2,203,472
APPARATUS FOR REGULATING A CONDITION
Filed Feb. 23, 1938  3 Sheets-Sheet 1

Inventor
Edwin X. Schmidt
By Frank H. Hubbard
Attorney

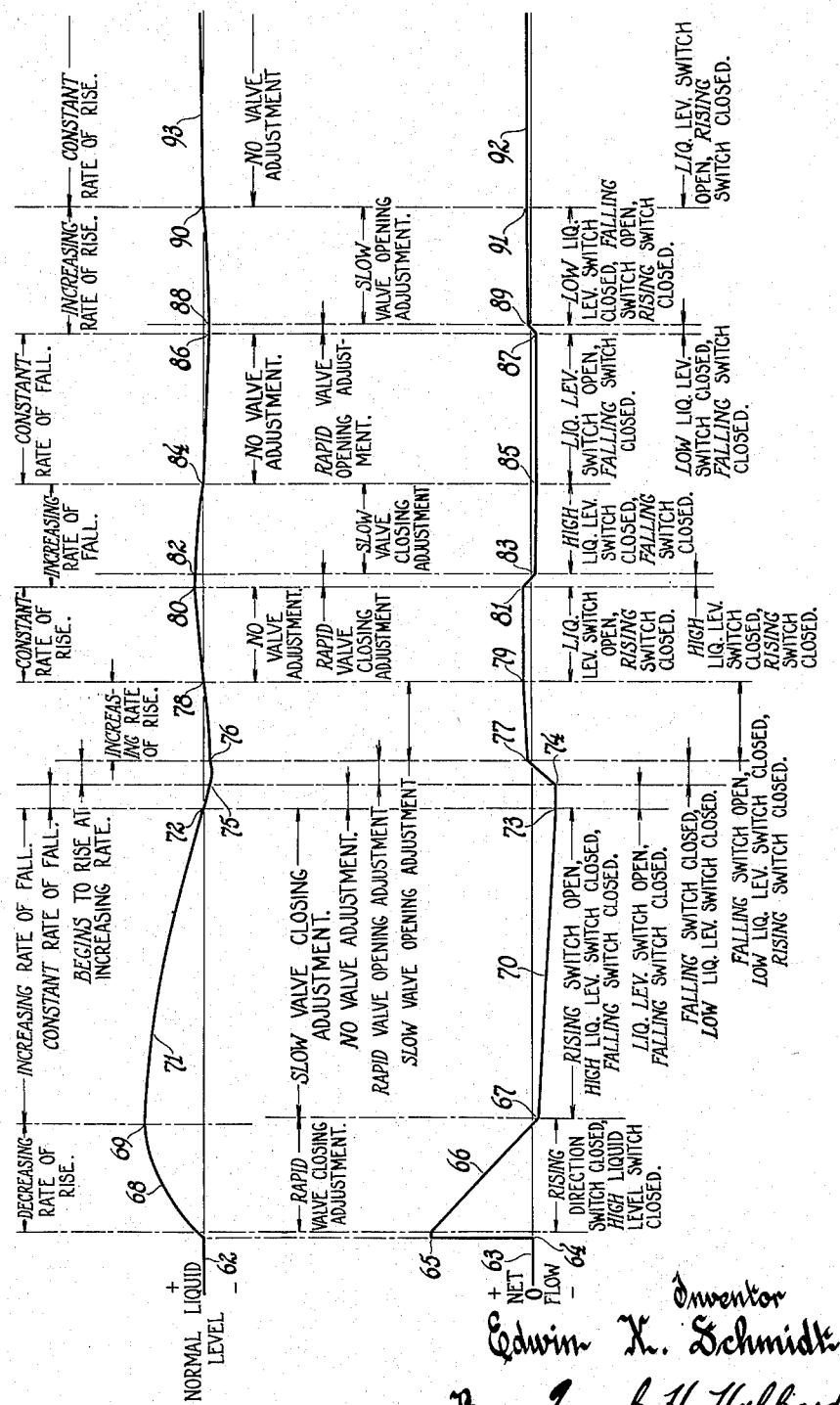

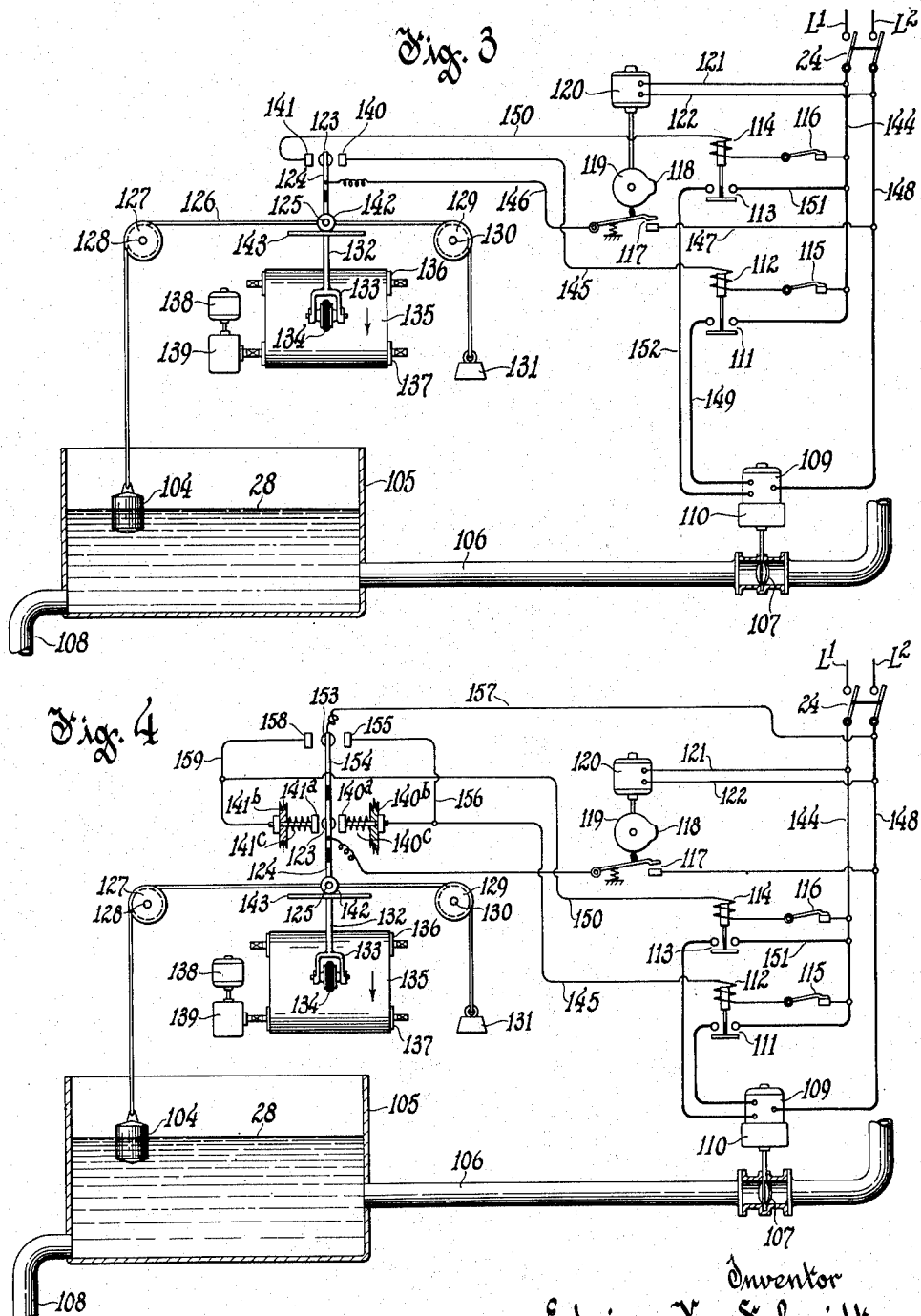

Patented June 4, 1940

2,203,472

UNITED STATES PATENT OFFICE 2,203,472

APPARATUS FOR REGULATING A CONDITION

Edwin X. Schmidt, Whitefish Bay, Wis., assignor to Cutler-Hammer, Inc., Milwaukee, Wis., a corporation of Delaware Application February 23, 1938, Serial No. 192,188

4 Claims. (Cl. 137—68)

This invention relates to apparatus for regulating a condition affected by variations in the rate of supply of and/or demand for a fluid. The invention relates more particularly to a float operated liquid level controlling system.

An object of the invention is to provide a system including a control element operable automatically in a direction, at a rate, and to a degree corresponding to the direction, rate and degree of divergence of a value with respect to another preselected value.

Another object of the invention is to provide a system in which the supply of material or energy is so controlled as to maintain a substantially constant predetermined condition independently of the rate at which material or energy is removed from the system.

Another object is to provide an automatic controlling or regulating device wherein the controlling effect produced is made proportional to the deviation from a predetermined desired condition, to thereby substantially prevent hunting due to over-regulation.

Another object is to provide control apparatus of the aforementioned character affording an indication of the trend or direction of divergence of the controlled medium from a predetermined or desired condition.

A more specific object is to provide a liquid level controlling device including an inlet valve which is automatically opened or closed to maintain the level of the liquid within certain predetermined limits under conditions of variation in the rate of outflow of or demand for the liquid.

Another object is to provide novel control means for a valve whereby upon a relatively slow rate of change in the liquid level the valve remains inoperative pending attainment of a predetermined maximum or minimum level of such liquid.

Another object is to provide control means of the character last mentioned whereby upon a relatively rapid rate of change in the liquid level the valve is operated automatically to reduce the rate of change to the relatively slow rate aforementioned; and to eventually reduce said rate of change to zero value upon attainment of a predetermined normal level of the liquid.

Another object is to provide a float operated liquid level controlling system wherein the rate of flow of a liquid into a container is varied substantially instantaneously in response to variations in the rate of outflow of or demand for the liquid.

Another object is to provide a float operated liquid level controlling system which is fully automatic in operation but subject to manual adjustment to conform to or to compensate for conditions encountered in a given installation.

Other objects and advantages of the invention will hereinafter appear.

The accompanying drawings illustrate certain embodiments of the invention which will now be described; it being understood that the invention is susceptible of embodiment in other forms without departing from the spirit and scope of my invention as defined by the appended claims.

In the drawings,

Fig. 2 illustrates graphically the operation of the system under conditions likely to be met with in practice.

Figure 1:
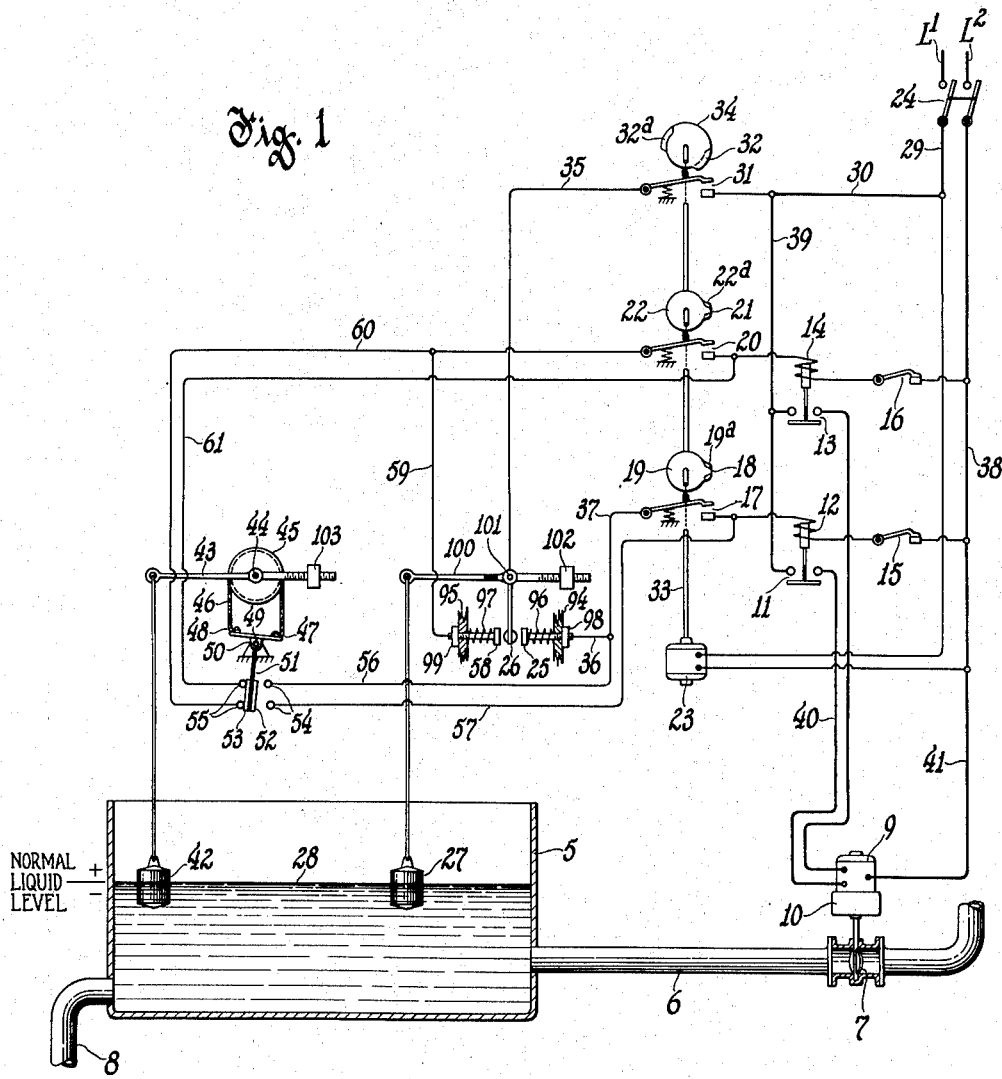
Figure 1 is a diagrammatic and schematic illustration of a float operated liquid level controlling system constructed in accordance with my invention.

Fig. 3 schematically and diagrammatically illustrates a modified form of float operated liquid level controlling system involving use of a single float.

Fig. 4 is a schematic and diagrammatic illustration of a control system similar to that shown in Fig. 3, but slightly modified to provide for an increase in the rate of valve operation under conditions of relatively large and/or relatively rapid variations in the rate of net flow of the liquid.

Referring first to Fig. 1, the numeral 5 designates a container or basin into which liquid, such as water, is supplied through conduit 6, from a suitable source, at a rate dependent upon the degree of opening of a valve 7. Liquid is discharged from tank 5 through the medium of conduit 8 at a rate dependent upon a variable rate of demand for the liquid—the particular means for controlling the rate of discharge of liquid from tank 5 forming no part of the present invention. It is to be understood that tank 5 may be of relatively great size, and in practice the rate of demand for the liquid from tank 5 is subject to rapid and relatively wide variations—for instance, an increase or decrease in the rate of demand of as much as two thousand gallons per minute.

It is desirable to maintain the level of liquid in tank 5 substantially constant, or within certain limits relatively to a preselected normal level thereof, notwithstanding the aforementioned variable rate of demand or discharge of liquid from said tank. Accordingly it is primarily desired to operate valve 7 in a direction and to a degree corresponding to the direction and degree of divergence of the level of liquid in tank 5 from the normal level preselected therefor.

Valve 7 is operable selectively toward the fully open position or closed position thereof by a split-field reversible motor 9 of well known form, through the medium of a suitable form of speed-reducing gearing designated in general by the numeral 10. Energization of motor 9 for operation thereof in a direction to effect opening movement of valve 7 is subject to closure of the normally open contacts 11 of an electromagnetically operable relay 12; and energization of said motor for operation thereof in a direction to effect closing movement of valve 7 is subject to closure of the normally open contacts 13 of an electromagnetically operable relay 14. A limit switch 15 is included in circuit in series with the operating winding of relay 12, switch 15 being arranged in any suitable manner for opening thereof, with consequent de-energization of relay 12 and motor 9, upon attainment of fully open position of valve 7. In like manner, a limit switch 16 is included in circuit in series with the operating winding of relay 14, switch 16 being opened in a well known manner for de-energization of relay 14 and motor 9 upon attainment of closed position of valve 7.

Included in circuit in series with the operating winding of relay 12 is an interrupter having normally open contacts 17 which are adapted to be closed upon engagement therewith of the complementary and relatively adjustable raised portions or cams upon a pair of rotary disks or the like 19, 19ª, which cams jointly provide the cam surface 18 of desired length. Also included in circuit in series with the operating winding of relay 14 is an interrupter having normally open contacts 20 which are adapted to be closed upon engagement therewith of the complementary and relatively adjustable raised portions or cams upon a pair of rotary disks or the like 22, 22ª, which cams jointly provide the cam surface 21. As shown, cam surfaces 18 and 21 occupy a pre-adjusted relatively small portion of the respective peripheries of pairs of disks 19, 19ª and 22, 22ª, and said cam surfaces are preferably arranged at like radial angles to said disks. The pairs of disks 19, 19ª and 22, 22ª are adapted to be continuously driven by a relatively small motor 23, which is adapted to be connected across lines L¹, L² through the medium of a manuualy operable main switch 24.

Connected in circuit in series with contacts 17 is the "low" contact 25 of a switch having a contactor 26 which is moved into engagement with contact 25 through the operation of float 27 when the liquid drops a predetermined degree below the normal level 28 thereof illustrated. Thus during engagement of contactor 26 with contact 25 motor 9 will be operated intermittently to effect step-by-step movement of valve 7 toward the fully open position thereof. The circuit thus provided for motor 9 results from closure of relay 12, the energizing circuit for which may be traced from line L¹ through the left hand pole of switch 24 by conductors 29 and 30 through the contacts 31. Contacts 31 are closed at all times during closure of either or both of the aforementioned switches 17 and 20, through the medium of a pair of disks 32, 32ª which are adjustable relatively to each other to provide the cam surface 34 which extends throughout at least one-half of the periphery of disks 32, 32ª jointly; and as will be apparent disks 32, 32ª may be adjusted to vary the extent of cam surface 34, up to the complete periphery of said disks jointly.

It follows that for certain installations the switch 31 and the cam operating means therefor may be omitted entirely, the function of switch 31 being hereafter more fully described. The aforementioned circuit may be further traced by conductor 35 through contactor 26 and contact 25, conductors 36 and 37 through contacts 17, during the closed period of the latter, thence through the operating winding of relay 12 and through the contacts of limit switch 15 to conductor 38, and through the right hand pole of switch 24 to line L². The disk 32, 32ª are likewise driven by motor 23, all of the aforementioned pairs of disks being rigidly attached to shaft 33 of motor 23.

Closure of contacts 11 of relay 12 completes a circuit for operation of motor 9 to effect movement of valve 7 toward fully open position, said circuit extending from line L¹ to conductor 30 by conductor 39 through said contacts 11, conductor 40 through one of the split field windings of motor 9, and by conductors 41 and 38 to line L². As shown, the disks 19 are so adjusted as to provide a relatively short cam surface 18, equal to, say, one-eighth of the periphery of said disks. As a result of operation of the parts aforedescribed motor 9 will be operated for a period corresponding to, say, one-eighth of the time required for one complete rotation of disks 19, to effect opening movement of valve 7, the motor being de-energized and valve 7 remaining stationary during the remainder of the period of rotation of said disks.

However, the system includes a second float 42 which operates a lever 43 pivoted at 44. Attached to and movable with lever 43 is a pulley or wheel 45 over which passes a belt or strap 46, the respective ends 47 and 48 of which are attached to opposite ends of a lever 49 which is centrally pivoted at 50 to a suitable support, the arrangement being such that belt 46 is under a slight degree of tension so as to provide for frictional driving thereof by pulley 45, but permitting slippage of said pulley relatively to the belt when the latter reaches the limit of its movement in either direction. Rigidly attached to and depending from lever 49 is a lever or rod 51 carrying bridging contact elements 52 and 53 on opposite sides thereof. Rod 51 is movable in one direction to effect engagement of element 52 with a pair of stationary contacts 54 and in the opposite direction to effect engagement of element 53 with a pair of stationary contacts 55. Thus, inasmuch as the liquid in tank 5 is shown at the normal lever 28 thereof, it may be assumed that the liquid was last raised to said level, in which event the float 42 would have been moved upwardly, with consequent engagement of element 53 with contacts 55, as shown.

Under the conditions heretofore assumed, however, the liquid level will have dropped sufficiently to cause engagement of contactor 26 with contact 25; whereas during such lowering of the liquid level float 42 will have dropped, with consequent engagement of element 52 with contacts 54, at a time prior to engagement of contactor 26 with contact 25, so that the aforementioned contacts 17 will be shunted by a short-circuit extending from conductor 36, by conductor 56 through contacts 54 as bridged by element 52, and by conductor 57 to and through the operating winding of relay 12, as aforedescribed.

As a result of short-circuiting of contacts 17 the duration of the period of operation of motor 9 for effecting opening movement of valve 7 will be greatly increased, such period of operation then corresponding to the relative length of the cam surface 34 which effects closure of the aforementioned contacts 31. Thus, as shown, disks 32, 32ᵃ are so adjusted as to provide for operation of motor 9 and opening movement of valve 7 during a period substantially corresponding to two-thirds of the time required for one complete rotation of disks 32, 32ᵃ jointly, motor 9 being deenergized and valve 7 remaining stationary during only the remaining one-third of said time period. It therefore follows that the degree of opening of valve 7 is greatly increased during each complete rotation of shaft 33, as a result of short-circuiting of contacts 17. As aforeindicated, disks 32, 32ᵃ may be so adjusted as to provide a continuous cam surface 34 to provide for continuous closure of contacts 31, thus providing for a still greater degree of opening of valve 7 during each complete rotation of shaft 33.

If, as a result of opening of valve 7 in the manner aforedescribed, the inflow into tank 5 exceeds the outflow therefrom the net flow of liquid into the tank will increase above normal or zero and the level of liquid in the tank will, of course, rise. As a consequence of the upward movement of float 42 element 52 will be disengaged from contacts 54, thereby interrupting the short-circuit around contacts 17 to decrease the degree of opening of valve 7 during each complete rotation of shaft 33. If the level of liquid in tank 5 continues to rise during such relatively slow rate of opening of valve 7 per unit of time, the normal level 28 of liquid in tank 5 will be attained, with consequent disengagement of contactor 26 from contact 25. This results in discontinuance of operation of motor 9 pending such a degree of rise of liquid above the normal level 28 thereof as to effect engagement of contactor 26 (operated by float 27) with a stationary contact 58. In the meantime the rising level of liquid has acted upon float 42 to effect engagement of element 53 with contacts 55, so that the aforementioned engagement of contactor 26 with contact 58 results in intermittent closure of the contacts 13 of relay 14 for a period depending solely upon the length of cam surface 34, with a relatively large degree of closing movement of valve 7 during each complete rotation of shaft 33.

The energizing circuit for the winding of relay 14 under the conditions just mentioned may be traced from line L¹ through the left hand pole of switch 24, conductors 29 and 30 through the contacts 31, during closure of the latter by cam surface 34, conductor 35, through contactor 26 and contact 58, conductors 59 and 60 through contacts 55, as bridged by element 53, conductor 61 through the operating winding of relay 14 (short-circuiting the contacts 20 of the switch controlled by cam surface 21), thence through the contacts of limit switch 16, by conductor 38 through the right hand pole of switch 24 to line L².

Valve 7 will therefore be moved toward its fully closed position in a step-by-step manner to degrees determined only by the length of cam surface 34, until the outflow from tank 5 exceeds the inflow thereinto. As soon as the level of liquid in tank 5 begins to drop, float 42 in moving downward serves to effect disengagement of element 53 from contacts 55, thus interrupting the short-circuit around contacts 20. The latter when thus rendered effective serve to reduce the degree of closing movement of valve 7 during each complete rotation of shaft 33. If the level of liquid in tank 5 continues to drop, then, substantially upon attainment of the normal level 28 thereof, float 27 will act to effect disengagement of contactor 26 from contact 58 to entirely discontinue operation of motor 9 for closing of valve 7. If the level of the liquid continues to drop, the same will after reaching the normal level 28, effect lowering of float 27, with consequent engagement of contactor 26 with contact 25. In the meantime the downward movement of float 42 will have caused engagement of element 52 with contacts 54, to short circuit contacts 17. Accordingly upon engagement of contactor 26 with contact 25 valve 7 will be intermittently moved toward fully open position through a relatively large degree upon each rotation of shaft 33, as determined by the length of cam surface 34, as aforedescribed.

Referring now to the graphic illustration of Fig. 2, in which the straight line 62 represents the preselected normal level of the liquid within tank 5 (Fig. 1), and the straight line 63 represents "zero" net flow of the liquid; namely, a condition in which the rate of outflow of liquid from tank 5 is exactly equal to the rate of flow of liquid into tank 5. Assuming that the liquid in tank 5 is at the normal level 28 (Fig. 1) as represented at line 62 in Fig. 2, and that the rate of flow of liquid from tank 5 is equal to the rate of flow thereinto as represented at line 63 in Fig. 2. Further assuming that at point 64 in Fig. 2 the rate of demand for the liquid is substantially reduced, with a consequent instantaneous increase in net flow of liquid into tank 5 as indicated at point 65; it will be understood that float 42 in rising will effect closure of the "rising direction" switch, as represented by element 53 and contacts 55 in Fig. 1; and float 27 upon a given rise of liquid above the normal level 28 thereof will cause engagement of contactor 26 with the "high" level contact 58. Due to short-circuiting of cam-operated contacts 17, as aforedescribed, there will result a relatively large degree of closing movement of valve 7 during each complete rotation of shaft 33, with a consequent decrease in the value of the net flow, as represented by the downwardly angled straight line 66 in Fig. 2, the net flow actually decreasing to a value slightly below "zero," as indicated at point 67.

During such rapid closing adjustment of valve 7 there is a decreasing rate of rise of the liquid level, as indicated by the curved line 68, and at point 69 the liquid level begins to fall. As a consequence float 42 in dropping effects disengagement of element 53 from contacts 55 to interrupt the short-circuit around contacts 17, which are thereby rendered effective to reduce the degree of closing movement of valve 7 upon each complete rotation of shaft 33. Float 42 in dropping likewise causes engagement of element 52 with contacts 54, but without immediate effect. Inasmuch as at point 67 the net flow into tank 5 is below "zero" (that is, the rate of flow into tank 5 is less than the rate of flow therefrom) and valve 7 is still being closed, although at a relatively slow rate, it follows that the net flow into tank 5 will gradually decrease further, as indicated by the downwardly angled line 70.

Due to such closing movement of valve 7 there will be an increasing rate of fall of the liquid level, as represented by the downwardly curved line 71. At point 72 in Fig. 2, however, the normal liquid level 28 (Fig. 1) will have been attained, with consequent complete interruption of the circuit of motor 9 and discontinuance of the closing movement of valve 7. As indicated at 73 and 74 in Fig. 2 there will be no change in the net flow, but inasmuch as the net flow is below "zero" there will be a constant rate of fall of the liquid level from point 72 to point 75, whereupon, due to closing of the "low" liquid level switch; namely, engagement of contact 25 (Fig. 1) by contactor 26, and prior closure of the "falling" switch; namely, bridging engagement of element 52 with contacts 54, there will be a rapid opening adjustment of valve 7, as controlled by contacts 31 (contacts 17 being short-circuited). Therefore between points 75 and 76 the liquid level will begin to rise at an increasing rate, thus increasing the net flow into tank 5 to a point above "zero," as indicated at 77. At point 76 due to the rise of liquid level float 42 will act to effect disengagement of element 52 from contacts 54, thereby interrupting the short-circuit around contacts 17, with a consequent slow rate of opening adjustment of valve 7.

The slow rate of opening adjustment of valve 7 provides an increasing rate of rise of the liquid level between points 76 and 78, with a consequent increase in the net flow, as indicated at 79. At point 78 the normal level 28 of the liquid will be attained, whereupon float 27 will act to effect disengagement of contactor 26 from contact 25. From point 78 to point 80 there will be no adjustment of valve 7, but due to the adjusted position of the valve there will be a constant rate of rise of the liquid level, and the net flow will remain constant between points 79 and 81. At point 80, float 27 will act to effect engagement of contactor 26 with high level contact 58; and due to the rising level of liquid float 42 will previously have acted to effect engagement of element 53 with contacts 55. Therefore, between points 80 and 82 a rapid rate of closing adjustment of valve 7 will be effected, with a consequent rapid rate of variation of the net flow between points 81 and 83.

At point 82 the falling level of liquid will result in disengagement of element 53 from contacts 55, thus interrupting the short-circuit around contacts 20, with a consequent slow rate of closing adjustment of valve 7 until the point 84 is reached, it being understood that due to closing movement of valve 7 there is an increasing rate of fall of the liquid level between points 80 and 84. The net flow will decrease slightly from point 83 to point 85.

At point 84 the normal level 28 of the liquid will be attained, with consequent disengagement of contactor 26 from contact 58 to effect discontinuance of the adjustment of valve 7. Accordingly there will be a constant rate of fall of the liquid level from point 84 to point 86, the net flow remaining constant, as indicated between points 85 and 87. At point 86 float 27 will act to effect engagement of contactor 26 with contact 25, float 42 having previously acted (due to falling of the liquid level) to effect engagement of element 52 with contacts 54. Accordingly there will be a rapid opening adjustment of valve 7 between points 86 and 88, the net flow into tank 5 increasing from a value slightly below "zero," as indicated at 87, to a value slightly above "zero," as indicated at 89. From point 86 to point 90 there will be an increasing rate of rise of the liquid level; the rising level acting at point 88 to effect disengagement of element 52 from contacts 54 to decrease the rate of opening adjustment of valve 7.

There will be a gradual increase in net flow of the liquid between points 89 and 91; and due to attainment of the normal level 28 of the liquid, as indicated at point 90, float 27 will act to effect disengagement of contactor 26 from contact 25 to again discontinue adjustment of valve 7. In view of the fact that the net flow is slightly above zero value, as indicated by the horizontal line 92, there will be a constant relatively slow rate of rise of the liquid level, as indicated by the slight upward angle of line 93. Under the conditions heretofore assumed the liquid level will continue to rise slowly (line 93) until the predetermined high level or limit is attained, whereupon float 27 will act to effect engagement of contactor 26 with contact 58 (float 42 having previously acted to effect engagement of element 53 with contacts 55) with consequent temporary rapid closing adjustment of valve 7.

As indicated in Fig. 2, the periods during which no adjustment of valve 7 is required are of progressively increased length or duration, as indicated respectively at 73—74; 79—81; 85—87, and line 92. Also as indicated by the liquid level line, starting with line 62, after a relatively wide variation in the rate of demand for the liquid, the system operates automatically in a desirable manner to compensate for such variation and to bring the liquid level to and maintain the same in or adjacent to the desired or normal level thereof, with a minimum of "hunting" or over-regulation. Although in Fig. 2 I have illustrated graphically the functioning or operation of the system in the event of a substantial decrease in the rate of demand for the liquid, it is to be understood that the elements of the system will operate in a similar but reverse manner in the event of a substantial, or in fact, any increase in the rate of demand for the liquid. Such an increase in the rate of demand for the liquid might occur at any point in the operation of the system graphically illustrated in Fig. 2, in which event the parts of the system will operate in a manner which is deemed obvious to compensate for such change in the rate of demand, whereby a predetermined or desired liquid level is attained and thereafter maintained approximately.

Referring again to Fig. 1, it should be noted that I prefer to provide contacts 25 and 58 with lost motion connections between the same and their respective supports 94 and 95, suitable springs 96 and 97 being associated with the respective contacts to bias the same toward the normal positions thereof illustrated. By this means the full movements of contactor 26 in opposite directions may be made to correspond exactly with the corresponding movements of float 27 without imposing an undue burden upon contactor 26 and contacts 25 and 58, such as would occur if said contacts were supported in fixed positions. Suitable means such as nuts 98 and 99 may be provided for adjusting the distances between contacts 25 and 58 and contactor 26 in the intermediate or neutral position of the latter, whereby the high and low limits of the liquid level may be preselected for purposes of each particular installation. For instance, in a given installation it might be desirable to provide for a wider degree of divergence of the liquid level above the normal or preselected level than is provided for divergence thereof below the normal level.

Lever 100 which is operated by float 27 is pivoted at 101 and is preferably provided with an adjustable weight 102 to partially counterbalance the float 27 for vertical or intermediate positioning of contactor 26 when the desired liquid level, exemplified by line 28, is attained in tank 5. In like manner the lever 43 which is operated by float 42 is provided with an adjustable weight 103 to provide for horizontal positioning of lever 43 when the desired level 28 of liquid has been attained. As heretofore pointed out the belt 46 associated with the direction switch moves the elements 52, 53 in one direction or the other, and then permits slippage of pulley 45 with respect thereto. If the direction of movement of the liquid level changes, the direction switch opens immediately on one side thereof and thereafter closes on the other side. Moreover, it should be particularly noted that the net flow of the liquid equals zero when the liquid level stops rising and/or falling.

In Fig. 3 I have illustrated a modified form of liquid level controlling system embodying use of a single float designated by the numeral 104. The tank 105 is provided with an inlet conduit 106 the rate of flow of liquid therethrough into tank 105 being subject to control by a valve 107, a conduit 108 being adapted to provide for discharge of the liquid from tank 105 in accordance with a demand which is subject to relatively wide variations. Valve 107 is operable in a direction to open or close the same through the medium of a split-field reversible motor 109, the latter being preferably provided with suitable reduction gearing designated in general by the numeral 110.

Operation of motor 109 in a direction to effect movement of valve 107 toward closed position is subject to control by a relay having normally open contacts 111 and an operating winding 112. Operation of motor 109 in a direction to effect movement of valve 107 toward full open position is likewise subject to control by a relay having normally open contacts 113 and an operating winding 114. Included in circuit in series with winding 112 is a limit switch 115 which is associated with valve 107 in any well known manner to provide for opening of said switch upon attainment of fully closed positioning of said valve. Included in circuit in series with winding 114 is a limit switch 116 which is likewise associated with valve 107 in any well known manner to provide for opening of said switch upon attainment of fully open positioning of said valve.

Included in circuit in series with one or the other of the operating windings 112 or 114 upon selective pre-setting of the latter for energization is a switch having normally open contacts 117 adapted to be moved intermittently to closed position, as by means of a cam surface 118 upon an element 119, which is adapted to be driven by a continuously operated electric motor 120 connected by conductors 121 and 122 to lines L¹ and L² through double-pole switch 24.

The means for selectively controlling energization of windings 112 and 114 preferably comprises a contactor 123 which is carried by a lever 124 pivoted upon a pin 125 attached to and movable with a cable or rope 126. One end of cable 126 passes over a wheel or pulley 127 having a fixed pivot 128 and is attached to the float 104 aforementioned. The other end of cable 126 passes over a wheel or pulley 129 having a fixed pivot 130 and is attached to a weight or the like 131 which partially counterbalances float 104.

The lower end 132 of lever 124 is forked at 133 to provide bearings for a wheel or roller 134 which is biased in any suitable manner against a continuous or endless strip or belt of suitable material or fabric 135. Strip 135 passes over rolls 136 and 137, the latter being continuously driven at a predetermined rate in the direction indicated by the arrow by a suitable electric motor 138 through reduction gearing 139, motor 138 being connected with any suitable source of energy supply, as, for instance, lines L¹, L², in an obvious manner.

Contactor 123 when moved toward the right is adapted to engage a fixed contact 140, and when moved toward the left is adapted to engage a fixed contact 141. Pin 125 is preferably provided with a roller 142 which engages a fixed plate or track 143 to maintain contactor 123 in proper alinement with contacts 140 and 141 in the event of temporary slackening of cable 126 between pulleys 128 and 130. The rate of movement of strip 135 and the cooperative relationship thereof to the engaging surface of wheel 134 is such that upon movement of pin 125 to the right or left of the position illustrated wheel 134 will tend to retain its initial relationship to strip 135, thus causing tilting or swinging of lever 124 carrying contactor 123, with a fulcrum substantially at the point or line of engagement of wheel 134 with strip 135. As will be understood, if the rate of movement of pin 125 in either direction from the position illustrated is relatively slow (as an incident to a relatively slow rate of rise or fall of the level of the liquid in tank 105) the wheel 134 will, due to its rolling action upon the moving strip 135, tend to assume a position in a line parallel with the direction of strip movement, thus reducing the deflecting action upon contact 123 of the movement of pin 125; wherefore engagement of contactor 123 with contact 140 or contact 141 may not be effected pending a given maximum degree of movement of pin 125 from the intermediate position thereof illustrated. On the other hand, in the event of a relatively rapid rate of movement of pin 125 (as an incident to a relatively rapid rate of rise or fall of the liquid level), such movement if continued for a relatively short period of time, will result in tilting of contactor 123 into engagement with contact 140 or contact 141.

Assuming closure of switch 24 in Fig. 3, let it be further assumed that line 28 represents the preselected normal level of liquid in tank 105. The respective positions of the control parts indicate not only that the normal level 28 of the liquid has been attained, but also that the net flow of liquid is of "zero" value; that is to say, the rate of flow of liquid into tank 105 through valve 107 corresponds exactly with the rate of demand, or discharge of liquid from said tank through conduit 108. If now there should be a relatively slight decrease in the rate of demand for the liquid the level of the latter would slowly rise above the line 28, with consequent slow upward movement of float 104 and movement of cable 126 and pin 125 toward the right. Such movement of pin 125 will cause tilting movement of lever 124, 132, with the point of engagement of wheel 134 with strip 135 as a fulcrum or center, so that contactor 123 will approach contact 140.

Due to the slowness of such movement of pin 125, wheel 134 will likewise move, by reason of the cooperative action of strip 135, toward a position in a line parallel with the direction of movement of said strip, wherefore the time required for contactor 123 to engage contact 140 will be increased. If the rise in level of the liquid persists, however, contactor 123 will eventually engage contact 140, thereby pre-setting an energizing circuit for winding 112 for completion upon intermittent closure of contacts 117 by the surface 118 of motor driven cam 119. The energizing circuit for winding 112 may be traced from line L¹ through the left hand pole of switch 24, conductor 144 through limit switch 115 and said winding 112, conductor 145, contact 140, contactor 123, conductor 146 through said contacts 117, when closed, and by conductors 147 and 148 through the right hand pole of switch 24 to line L².

Thus under conditions of relatively slowly rising level of the liquid in tank 105 contactor 123 coacts with contact 140 primarily as a means for limiting the rise in level of liquid within tank 105. On the other hand, in the event of a relatively large decrease in the rate of demand for the liquid, a relatively rapid rate of rise of the liquid level will result. Consequently pin 125 will move toward the right at a rate considerably faster than the rate at which wheel 134 tends to move into vertical alinement with said pin, wherefore a relatively large degree of tilting of lever 124, 132 is effected, so that contactor 123 is engaged with contact 140.

Upon closure of contacts 111 through energization of winding 112, as aforedescribed, a circuit is completed for operation of motor 109 in a direction to effect movement of valve 107 toward closed position, said circuit extending from line L¹ through the left hand pole of switch 24, by conductor 144 through contacts 111, conductor 149 through one of the split-field windings of motor 109, and by conductor 148 and the right hand pole of switch 24 to line L². Movement of valve 107 toward closed position is effected in a step-by-step manner for periods depending upon the length of surface 118 (which may be varied by providing a substitute for cam 119, or by providing adjustable pairs of cams like 19, 19ª and 22, 22ª shown in Fig. 1) during each complete rotation of cam 119 by motor 120.

The aforesaid intermittent movement of valve 107 toward closed position will continue until the level of liquid in tank 105 begins to fall, at which time float 104 in moving downwardly causes movement of cable 126 and pin 125 toward the left to tilt lever 124, 132 in a like direction (with wheel 134 as a fulcrum) with consequent disengagement of contactor 123 from contact 140. If, after disengagement of contactor 123 from contact 140, the rate of discharge through conduit 108 should decrease (due to a decrease in the rate of demand) to an extent such as to result in "zero" net flow, the level of liquid in tank 105 would remain stationary, so that no adjustment of valve 107 would be required.

On the other hand, if the level of liquid in tank 105 falls relatively slowly, pin 125 will continue to move toward the left, during which time wheel 134 tends to move toward vertical position with reference to pin 125, wherefore a relatively long period of time will be required to effect engagement of contactor 123 with contact 141. However, if the level of liquid should fall relatively rapidly, pin 125 would move toward the left at a rate considerably more rapid than the rate at which wheel 134 tends to move to vertical alinement with said pin, and the greater degree of tilting of lever 124, 132 toward the left (with wheel 134 as a fulcrum) will reduce the time required for contactor 123 to engage contact 141.

Engagement of contactor 123 with contact 141 pre-sets the energizing circuit of relay winding 114 for completion during intermittent closure of contacts 117 by the aforementioned surface 118 of cam 119. Said circuit may be traced from line L¹ through the left hand pole of switch 24, conductor 144 through the contacts of limit switch 116, thence through winding 114, conductor 150, contact 141 and contactor 123, conductor 146 through the aforementioned contacts 117, when closed, and by conductors 147 and 148 through the right hand pole of switch 24 to line L².

Closure of the relay contacts 113 completes an alternative energizing circuit for motor 109, said circuit extending from line L¹ through the left hand pole of switch 24, conductors 144 and 151 through said contacts 113, conductor 152 through the other split-field winding of motor 109, and by conductor 148 through the right hand pole of switch 24 to line L². Motor 109 will therefore be operated intermittently to effect step-by-step movement of valve 107 toward fully open position. Such intermittent movement of valve 107 toward fully open position will continue pending a reversal of the trend of the liquid level; or in other words, pending a rise in such liquid level, which will result in disengagement of contactor 123 from contact 141 to effect discontinuance of the intermittent operation of motor 109.

It is to be understood that the "high level" or "rapid rise" contact 140 and the "low level" or "rapid fall" contact 141 are of the fixed or butt type, whereby upon engagement of contactor 123 with either of the same any further movement of cable 126 and pin 125 in the same direction will cause the tail skid or wheel 134 to slip with respect to strip 135.

With further reference to Fig. 3, let it be assumed that, with the liquid at approximately the normal level 28, a relatively rapid rise in the level takes place (due to a relatively large decrease in the rate of demand). As a result lever 124, 132 will be tilted rather quickly toward the right, about the point of contact of wheel 134 upon strip 135 as a center, to effect engagement of contactor 123 with contact 140, thus providing for intermittent closing movement of valve 107 in the manner aforedescribed. If, as a result of closing movement of valve 107, or as a result of an increase in the rate of demand for the liquid, the rate of rise of the liquid level becomes less than the follower return action (that is, the rate at which wheel 134 in cooperation with strip 135 permits lever 124, 132 to return to vertical position after tilting thereof), such return of lever 124, 132 to vertical position will effect disengagement of contactor 123 from contact 140 to prevent further adjustment of valve 107 until the liquid has attained substantially the maximum level permitted by the relative position of contact 140. In the event of a fall in the liquid level, contactor 123 will function in a like manner with reference to contact 141.

The liquid level controlling system illustrated in Fig. 4 is in many respects like that illustrated in Fig. 3 and like parts in these figures have been given corresponding numerals of reference. Other parts shown in Fig. 4 which are functionally similar to, but structurally slightly different from, parts shown in Fig. 3 have been given like numerals with the letter "a" added. Thus in Fig. 4 I prefer to arrange the contacts 140ª, 141ª in less widely spaced relation than are the contacts 140, 141 in Fig. 3. With this arrangement contactor 123 will engage contact 140ª to effect intermittent closing movement of valve 107 upon a lesser degree of rise of the liquid from the normal level 28 thereof, and said contactor 123 will engage contact 141ª upon a lesser degree of fall of the liquid from said normal level, than is provided in the system of Fig. 3. Also in Fig. 4 contact 140ª, when engaged by contactor 123, is yieldable within its support 140ᵇ against the bias of a relatively light coiled compression spring 140ᶜ; contact 141ª being similarly mounted upon a support 141ᵇ and biased by a spring 141ᶜ.

Thus upon engagement of contactor 123 with contact 140ª or with contact 141ª valve 107 will be operated intermittently toward closed position or fully open position, respectively. Upon such engagement of contactor 123 with contact 140ª (due to a rapid rise in the level of the liquid, or due to a relatively slow rise thereof above the maximum level preselected) if the rise in liquid level continues notwithstanding the intermittent movements of valve 107 toward closed position, contact 140ª will yield to permit continued movement of portion 124 of the lever toward the right, wherefore the contactor 153 carried by extension 154 will eventually engage the fixed contact 155, thus providing for continuous energization of operating winding 112 by a circuit shunting the cam operated contacts 117. The alternative circuit for winding 112 may be traced from line L¹ through the left hand pole of switch 24, conductor 144 through limit switch 115, winding 112, conductors 145 and 156, contact 155, contactor 153, conductors 157 and 148 through the right hand pole of switch 24 to line L².

Similarly, in the event of a rapid fall of the liquid level, or upon attainment of the minimum level preselected therefor by the normal positioning of contact 141ª, contact 123 will engage the latter to preset a circuit for relay winding 114 for intermittent energization thereof, as controlled by cam operated contacts 117. If the liquid level continues to fall notwithstanding the intermittent movement of valve 107 toward fully open position, contact 141ª will yield, thus permitting eventual movement of contactor 153 into engagement with the fixed contact 158, to provide for continuous energization of operating winding 114 by a circuit shunting the cam operated contacts 117. This alternative circuit for winding 114 may be traced from line L¹ through the left hand pole of switch 24, conductor 144 through limit switch 116, winding 114, conductors 150 and 159, contact 158, and thence through contactor 153 to line L², as heretofore traced.

The system illustrated in Fig. 4 thus provides for either intermittent or continuous adjustment of valve 107 toward fully open position or closed position, thereby minimizing the time required to bring the liquid within the maximum and minimum levels preselected therefor; and enabling the system to more readily and quickly compensate for relatively large variations in the rate of demand for the liquid.

Other uses for systems of the general character herein disclosed will be at once suggested or obvious to those skilled in the art.

While I have disclosed my invention as applied to systems of liquid level control wherein the rate of discharge from the tank is inherently subject to relatively wide variations, as an incident to relatively wide variations in the rate of demand for the liquid, and wherein the rate of supply of the liquid is varied automatically at a rate and to a degree to compensate for the variations in the rate of discharge; it will be apparent to those skilled in the art that my invention is equally applicable to installations wherein the volumetric rate of supply of liquid is inherently subject to relatively wide variations, and the rate of discharge must be varied automatically at a rate and to a degree to normally render the volumetric rate of discharge substantially equal to the volumetric rate of supply. In such an installation the valve 7 (Fig. 1) or 107 (Figs. 3 and 4) would be omitted from the supply conduit and a like valve (or an equivalent adjustable flow controlling device) would be placed in the discharge conduit, the same being so arranged and coordinated with the control mechanism responsive to variations in the level of liquid in the tank as to provide for opening adjustment of the valve to increase the rate of discharge as an incident to a predetermined degree of rise in the liquid level, etc., or, in other words, to function in substantially the reverse manner from that of the systems hereinabove described.

Also it is to be understood that the adjustable valve herein disclosed is a preferred form of flow controlling means, it being obvious that a motor driven pump or the like may be substituted for the valve, it being only necessary to provide means operable automatically to vary the speed of operation of the pump driving motor to afford a function corresponding to the aforedescribed opening or closing adjustment of the valve.

As will be apparent to those skilled in the art the present invention is applicable to control of liquid level, as herein disclosed, or alternatively to control of pressure or temperature conditions; and, in fact, to control of any condition of similar character, which condition is affected by a difference in the quantitative flow of material or energy into and/or out of a system.

What I claim as new and desire to secure by Letters Patent is:

1. In a liquid level controlling system, in combination, a tank, a source of supply of liquid for said tank, a valve adjustable toward fully open or closed position to vary the rate of supply of liquid to said tank, means for discharging liquid from said tank in accordance with the rate of demand therefor, a float operable in response to variations in the level of liquid within said tank, a reversible electric motor adapted when energized to effect adjustment of said valve in reverse directions selectively, switch mechanism subject to control by said float and normally operable upon attainment of a predetermined maximum or a predetermined minimum level of liquid within said tank to initiate operation of said motor in one direction or the other to effect closing or opening adjustments, respectively, of said valve, power driven cam means associated with said switch mechanism and normally operable to limit said motor to predetermined periods of operation and inoperation alternately whereby said valve is moved in a step-by-step manner toward closed or fully open position, and a second float operable in response to a change in the direction of variation in the level of liquid within said tank to initially render said cam means ineffective, whereby the degree of adjustment of said valve toward closed or fully open position is substantially increased per unit of time.

2. In a liquid level controlling system, in combination, a tank, a source of supply of liquid for said tank, a valve adjustable toward fully open or closed position to vary the rate of supply of liquid to said tank, means for discharging liquid from said tank in accordance with the rate of demand therefor, a float operable in response to variations in the level of liquid within said tank, a reversible electric motor adapted when energized to effect adjustment of said valve in reverse directions selectively, switch mechanism subject to control by said float and normally operable upon attainment of a predetermined maximum or a predetermined minimum level of liquid within said tank to initiate operation of said motor in one direction or the other to effect closing or opening adjustments, respectively, of said valve, power driven cam means associated with said switch mechanism and normally operable to limit said motor to predetermined periods of operation and inoperation alternately whereby said valve is moved in a step-by-step manner toward closed or fully open position, a second float operable in response to a change in the direction of variation in the level of liquid within said tank to initially render said cam means ineffective, whereby the degree of adjustment of said valve toward closed or fully open position is substantially increased per unit of time, and said second float being also operable in response to a reversal of the direction of variation in the level of liquid within said tank to thereupon render said cam means effective, whereby the rate of adjustment of said valve toward closed or fully open position is substantially decreased.

3. In a liquid level controlling system, in combination, a tank, a source of supply of liquid for said tank, a valve adjustable toward fully open or closed position to vary the rate of supply of liquid to said tank, means for discharging liquid from said tank in accordance with the rate of demand therefor, a float operable in response to variations in the level of liquid within said tank, a reversible electric motor adapted when energized to effect adjustment of said valve in reverse directions selectively, switch mechanism subject to control by said float and normally operable upon attainment of a predetermined maximum or a predetermined minimum level of liquid within said tank to initiate operation of said motor in one direction or the other to effect closing or opening adjustments, respectively, of said valve, power driven cam means associated with said switch mechanism and normally operable to limit said motor to predetermined periods of operation and inoperation alternately whereby said valve is moved in a step-by-step manner toward closed or fully open position, a second float operable in response to a change in the direction of variation in the level of liquid within said tank to initially render said cam means ineffective, whereby the degree of adjustment of said valve toward closed or fully open position is substantially increased per unit of time, said second float being also operable in response to a reversal of the direction of variation in the level of liquid within said tank to thereupon render said cam means effective, whereby the rate of adjustment of said valve toward closed or fully open position is substantially decreased, and said switch mechanism being operable by said first mentioned float, in response to a predetermined variation in the level of the liquid within said tank, to completely interrupt the energizing circuit of said motor, for the purpose set forth.

4. In a liquid level controlling system, in combination, a tank, means for effecting a flow of liquid into said tank, means for effecting a flow of liquid out of said tank, one of said flows being inherently subject to relatively large variations, means for varying the other of said flows to tend to render said flows substantially equal volumetrically, said last mentioned means comprising a float and switching means controlled thereby in response to a predetermined degree of rise or fall of the level of liquid in said tank, with respect to a normal level preselected therefor, to effect a predetermined variation in the volumetric rate of said other flow, a second float, and switching means controlled by the latter in response to a reversal of the trend of variation of said liquid level to modify the effect of said flow varying means, to thereby prevent "hunting" or over-regulation by the latter.

EDWIN X. SCHMIDT.